(12) United States Patent
Fujita

(10) Patent No.: US 7,846,592 B2
(45) Date of Patent: Dec. 7, 2010

(54) FUEL CELL SYSTEM, FUEL CELL POWER GENERATION APPARATUS AND METHOD THEREFOR

(75) Inventor: Goro Fujita, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 1125 days.

(21) Appl. No.: 11/509,802

(22) Filed: Aug. 25, 2006

(65) Prior Publication Data

US 2007/0048569 A1 Mar. 1, 2007

(30) Foreign Application Priority Data

Aug. 26, 2005 (JP) ............................. 2005-245542

(51) Int. Cl.
*H01M 8/04* (2006.01)
(52) U.S. Cl. ...................... 429/414; 429/408; 429/420; 429/431
(58) Field of Classification Search ................. 429/408, 429/414, 420, 431
See application file for complete search history.

(56) References Cited

U.S. PATENT DOCUMENTS

| 2001/0008718 | A1* | 7/2001 | Kobayashi | 429/9 |
| 2004/0185314 | A1* | 9/2004 | Miyamoto et al. | 429/22 |
| 2004/0212194 | A1* | 10/2004 | Okusawa et al. | 290/1 R |
| 2005/0084723 | A1* | 4/2005 | Mori | 429/22 |
| 2006/0204803 | A1* | 9/2006 | Yamaguchi | 429/22 |

FOREIGN PATENT DOCUMENTS

| JP | 2001-243961 | 9/2001 |
| JP | 2004-265833 | 9/2004 |
| JP | 2005-108811 A | 4/2005 |
| KR | 10-2005-0025496 | 3/2005 |

OTHER PUBLICATIONS

Korean Office Action, with English translation, issued in Korean Patent Application No. KR 10-2006-80353, mailed Jun. 25, 2007.
Japanese Office Action, with English translation, issued in Japanese Patent Application No. 2005-245542, mailed Jul. 20, 2010.

* cited by examiner

*Primary Examiner*—Dah-Wei D Yuan
*Assistant Examiner*—Amanda Barrow
(74) *Attorney, Agent, or Firm*—McDermott Will & Emery LLP

(57) ABSTRACT

A fuel cell power generation system which adjusts the amount of fuel, in a fuel cell power generation apparatus, into a predefined range is provided. A fuel cell system includes a fuel cell power generation apparatus, a control means which has the fuel cell power generation apparatus output a preset electric power value, and a power supply unit which charges and supplies an electric power to an external. The control means changes the electric power value outputted from the fuel cell power generation apparatus, based on the status of liquid fuel detected by a fuel state detecting means.

9 Claims, 6 Drawing Sheets

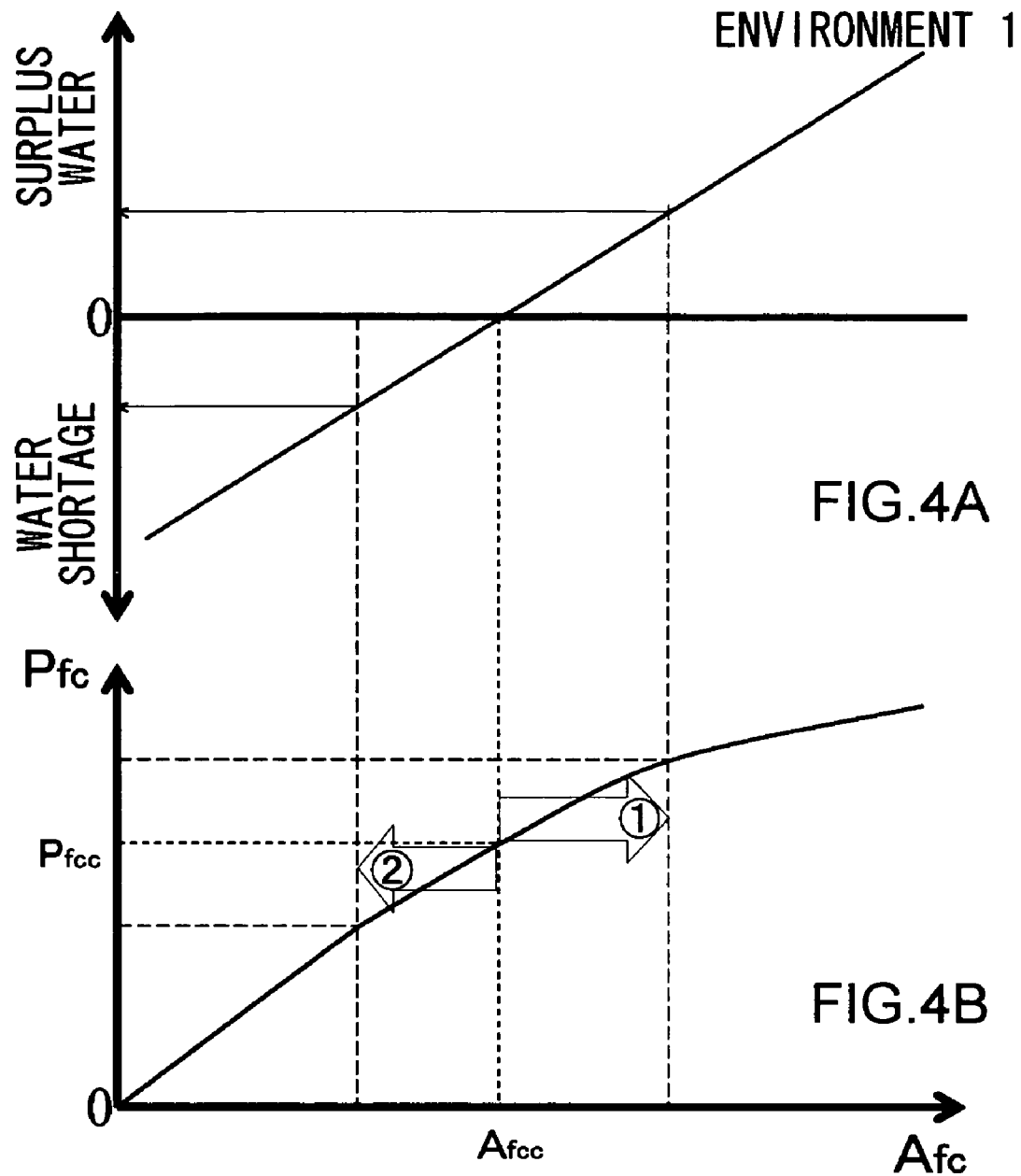

FUEL CELL SYSTEM, FUEL CELL POWER GENERATION APPARATUS AND METHOD THEREFOR

BACKGROUND OF THE INVENTION

1. Field of the Invention

The present invention relates to a fuel cell system, a fuel cell power generation apparatus, and a method for operating the fuel cell power generation apparatus. More particularly, the present invention relates to a fuel cell power generation apparatus capable of adjusting the amount of fuel therein into a predefined range by controlling the operation point of the fuel cell, a method for operating the fuel cell power generation apparatus, and a fuel cell system including the fuel cell power generation apparatus.

2. Description of the Related Art

A fuel cell is a device that generates electricity from hydrogen and oxygen so as to obtain highly efficient power generation. A principal feature of a fuel cell is its capacity for direct power generation which does not undergo a stage of thermal energy or kinetic energy as in conventional power generation. This presents such advantages as high power generation efficiency despite the small scale setup, reduced emission of nitrogen compounds and the like, and environmental friendliness on account of minimal noise or vibration. A fuel cell is capable of efficiently utilizing chemical energy in its fuel and as such environmentally friendly. Fuel cells are therefore envisaged as an energy supply system for the twenty-first century and have gained attention as a promising power generation system that can be used in a variety of applications including space applications, automobiles, mobile devices, and large and small scale power generation. Serious technical efforts are being made to develop practical fuel cells.

Of various types of fuel cells, a polymer electrolyte fuel cell (PEFC) excels in its low operating temperature and high output density. Recently, direct methanol fuel cells (DMFC) are especially attracting the attention as a type of polymer electrolyte fuel cell. In a DMFC, methanol water solution as a fuel is not reformed and is directly supplied to the anode so that electricity is produced by an electrochemical reaction induced between the methanol water solution and oxygen. Discharged as reaction products resulting from the electrochemical reaction are carbon dioxide emitted from the anode and generated water emitted from the cathode. Methanol water solution has a higher energy density per unit volume than hydrogen. Moreover, it is suitable for storage and poses little danger of explosion. Accordingly, it is expected that methanol water solution will be used in power supplies for automobiles, mobile devices (cell phones, notebook personal computers, PDAs, MP3 players, digital cameras, electronic dictionaries and books) and the like.

When a DMFC generates power, the fuel is consumed. Therefore a DMFC system using a DMFC normally receives the supply of fuel from a fuel tank which is provided detachably on the DMFC system and which is filled with pure methanol or a high concentration methanol solution. And the arrangement is such that when the fuel tank becomes empty of the fuel, the fuel tank is replaced with a new one.

3. Related Art List (1) Japanese Patent Application Laid-Open No. 2005-108811.

In a conventional fuel cell system, carbon dioxide discharged from the anode is separated from the fuel, which is also discharged from the anode, and released to the outside of the system. Accordingly, the arrangement is such that part of the fuel passage, especially the fuel storage area, is open to the outside. Yet, from this opening, the moisture and methanol in the fuel are also released together with carbon dioxide, and the amount of release (evaporation) also varies with the environmental conditions, such as temperature and humidity. As a result, there are cases where it is difficult to adjust the amount of fuel inside a fuel cell system to a constant level.

SUMMARY OF THE INVENTION

The present invention has been made in view of the foregoing circumstances, and a general purpose thereof is to provide a fuel cell power generation apparatus capable of adjusting the amount of fuel therein into a predefined range, a method for operating such a fuel cell power generation apparatus, and a fuel cell system including such a fuel cell power generation apparatus.

One embodiment of the present invention relates to a fuel cell power generation apparatus. This fuel cell power generation apparatus comprises: a fuel cell which generates power upon receipt of a supply of liquid fuel; a fuel circulation means which supplies the liquid fuel to the fuel cell and recovers a discharged substance from the fuel cell; and a fuel state detecting means, provided in the fuel circulation means, which detects a status of liquid fuel. As such, the amount of fuel in the fuel cell power generation apparatus can be adjusted into a predefined range.

Here the liquid fuel is not limited to methanol (aqueous solution) as mentioned above, but may be ethanol, isopropyl alcohol (IPA), ethylene glycol, dimethyl ether or the like. From this type of fuel cell for which a liquid fuel is directly supplied, carbon dioxide and water are discharged as reaction products, and the water in particular is often recovered and mixed into the liquid fuel. Fuel cells which feature the reuse of recovered water are mostly the so-called active-type DMFCs, which may use a pump or similar machinery. Yet, such fuel cells may also be the so-called passive type which has no means for actively recovering water and uses natural convection or capillary phenomenon for fuel circulation, so long as they are capable of supplying liquid fuel and recovering the discharges. The state of liquid fuel may be such that it is possible to estimate the amount (volume) of fuel within the fuel cell power generation apparatus. That is, if the total volume of the space through which the liquid fuel passes is known, it is possible to estimate the amount (volume) of fuel from pressure and temperature and also from water level.

In the fuel cell power generation apparatus according to the above embodiment, the fuel state detecting means may be a volume detecting means which detects the volume of the liquid fuel circulating in the fuel circulation means. In the fuel cell power generation apparatus according to any of the above embodiments, the fuel circulation means may include a fuel storage means which stores the liquid fuel that circulates. In a fuel cell power generation apparatus according to the above embodiment, the fuel state detecting means may be provided in the fuel storage means and may be a water level detecting means which detects the water level of the liquid fuel. Here, the water level detecting means may be a float or like means capable of detecting the state of liquid fuel in real time, or may also be a limiter or similar means.

Another embodiment of the present invention relates to a fuel cell system. This fuel cell system comprises: a fuel cell power generation apparatus according to any of the above embodiment; and a control means which has the fuel cell power generation apparatus output a preset electric power value. In the fuel cell system according to the above embodiment, the control means may change the electric power value outputted from the fuel cell power generation apparatus, based on the status of liquid fuel detected by the fuel state detecting means. As a result, the amount of fuel within the fuel cell power generation apparatus can be adjusted into a predefined range. Also, since it is sometimes difficult for a fuel cell to respond to load variation occurring within seconds or less, stable operation thereof in a predetermined electric power value can ensure a longer life for a fuel cell power generation apparatus and a fuel cell system using it.

In the fuel cell system according to any of the above embodiments, there may be further provided a power supply unit which charges and supplies power to an external. Accordingly, even when a fuel cell alone cannot respond to load variation occurring within seconds or less as mentioned above, it becomes possible to respond to and follow such load variation by having the fuel cell power generation apparatus output a predetermined power. It also becomes possible to track such load variation by having the power supply unit recharged when the required power is lower than the power outputted from the fuel cell power generation apparatus or having the power supply unit also supply power when the required power is higher than the power outputted from the fuel cell power generation apparatus. Also, this arrangement makes it possible to start or stop the fuel cell system promptly and allows it to supply power to the load efficiently by balancing the fuel cell power generation apparatus and the power supply unit.

In the fuel cell system according to the above embodiment, when the fuel cell power generation apparatus is started, the electric power charged in the power supply unit may be used. When a power demand is higher than the preset electric power value, the electric power charged in the power supply unit may be used. When a power demand is lower than the preset electric power value, an electric power from the fuel cell power generation apparatus may be used for charging the power supply unit. When the fuel cell power generation apparatus is stopped, the electric power from the fuel cell power generation apparatus may be used for charging the power supply unit. This arrangement therefore makes it possible to start or stop the fuel cell system promptly and allows it to supply power to the load efficiently by balancing the fuel cell power generation apparatus and the power supply unit.

In the fuel cell system according to the any of the above embodiments, the preset electric power value may be set in a manner that, during a period from when the fuel cell system is started and until it is stopped, an amount of charge for which an electric power is supplied to the power supply unit is greater than an amount of discharge for which the power supply unit supplies an electric power to the external. This arrangement makes it possible to avoid a situation where the electric energy to be charged in the power unit becomes zero and thus the fuel cell system cannot be started.

In the fuel cell system according to any of the above embodiments, during a period from when the fuel cell system is started and until it is stopped, a capacity of the power supply may be one to 2.5 times an amount of discharge for which the power supply unit supplies an electric power to the external. In this fuel cell system, during a period from when the fuel cell system is started and until it is stopped, the capacity of the power supply may be 1.3 to 2 times the amount of discharge for which the power supply unit supplies the electric power to the external. This arrangement makes it possible to respond to load variation and further allows response to variation in the power outputted from the fuel cell power generation apparatus. Also, the setting of a proper range can realize a fuel cell system in a compact size.

Still another embodiment of the present invention relates to a hybrid power supply system. This hybrid power supply system includes a power supply unit capable of supplying an electric power to an external and a second power supply unit capable of supplying an electric power to the external and charging it, and the hybrid power supply system is characterized by the features that the first power supply outputs a preset electric power value and the second power supply unit supplies and charges the electric power in accordance with a power demand. This arrangement makes it possible to respond to and follow load variation by having the first power supply unit output a predetermined power and having the second power supply unit recharged when the required power is lower than the power outputted from the first power supply unit or having the second power supply unit also supply power when the required power is higher than the power outputted from the first power supply unit. Also, this arrangement allows this hybrid power supply system to supply power to the load efficiently by balancing the first power supply unit and the second power supply unit.

Still another embodiment of the present invention relates to a method for operating a fuel cell. This fuel cell operation is a method for operating a power generation apparatus which comprises: a fuel cell which generates power with a supply of liquid fuel; a fuel circulation means which supplies the liquid fuel to the liquid fuel and recovers a discharged substance from the fuel cell; a fuel state detecting means, provided in the fuel circulation means, which detects a status of liquid fuel; and a control means which controls the fuel cell, the fuel circulation means and the fuel state detecting means, and the operating method is characterized in that the control means controls in a manner that the fuel cell is operated at high current when a volume of the liquid fuel decreases.

In the type of fuel cell for which a liquid fuel is directly supplied, the liquid fuel has the role of a thermal medium for the fuel cell and of a cooling medium especially during normal or steady operation. This type of fuel cell has the problem that if the volume of the liquid fuel reduces, there will be a drop in the cooling effect of the liquid fuel on the fuel cell. Also, if a gas enters a liquid fuel supply channel to the fuel cell (outward path of the fuel circulation means) due to a reduction in the volume of the liquid fuel, there will be a fuel starvation on the anode side. And if an attempt is made to obtain an output from the fuel cell in this state, there will arise the problem that the carbon components of the carbon members (separator, diffusion layer, catalyst layer) used near the anode will decompose. Thus, the structure employed in the present embodiment assures the avoidance of the above problem by securing a necessary amount of liquid fuel in the fuel cell power generation apparatus.

Still another embodiment of the present invention relates also to a method for operating a fuel cell. This fuel cell operation is a method for operating a power generation apparatus which comprises: a fuel cell which generates power with a supply of liquid fuel; a fuel circulation means which supplies the liquid fuel to the liquid fuel and recovers a discharged substance from the fuel cell; a fuel state detecting means, provided in the fuel circulation means, which detects a status of liquid fuel; and a control means which controls the fuel cell, the fuel circulation means and the fuel state detecting means, and the operating method is characterized in that the control means controls in a manner that the fuel cell is operated at low current when a volume of the liquid fuel increases.

From this type of fuel cell for which a liquid fuel is directly supplied, carbon dioxide and water are discharged as reaction products, and the water in particular is often recovered and mixed into the liquid fuel. Therefore, when much water is produced, the problem arises that the water may overflow from the fuel circulation means. Thus, the structure employed in the present embodiment makes sure that the liquid fuel within the fuel cell power generation apparatus is adjusted into a range where there is no overflow of water from the fuel circulation means.

It is to be noted that any arbitrary combinations or rearrangement, as appropriate, of the aforementioned constituting elements and so forth are all effective as and encompassed by the embodiments of the present invention.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 4A is a graph representing an amount of aqueous methanol solution in a fuel tank under environment 1 of a fuel cell system according to an embodiment of the present invention; and FIG. 4B is a graph showing a relationship between currents and power generated by a fuel cell generation apparatus according to an embodiment of the present invention;

DETAILED DESCRIPTION OF THE INVENTION

The invention will now be described by reference to the preferred embodiments. This does not intend to limit the scope of the present invention, but to exemplify the invention.

Hereinbelow, a detailed description is given of a structure of a fuel cell system 100 according to the present invention with reference to the figures.

Figure 1:
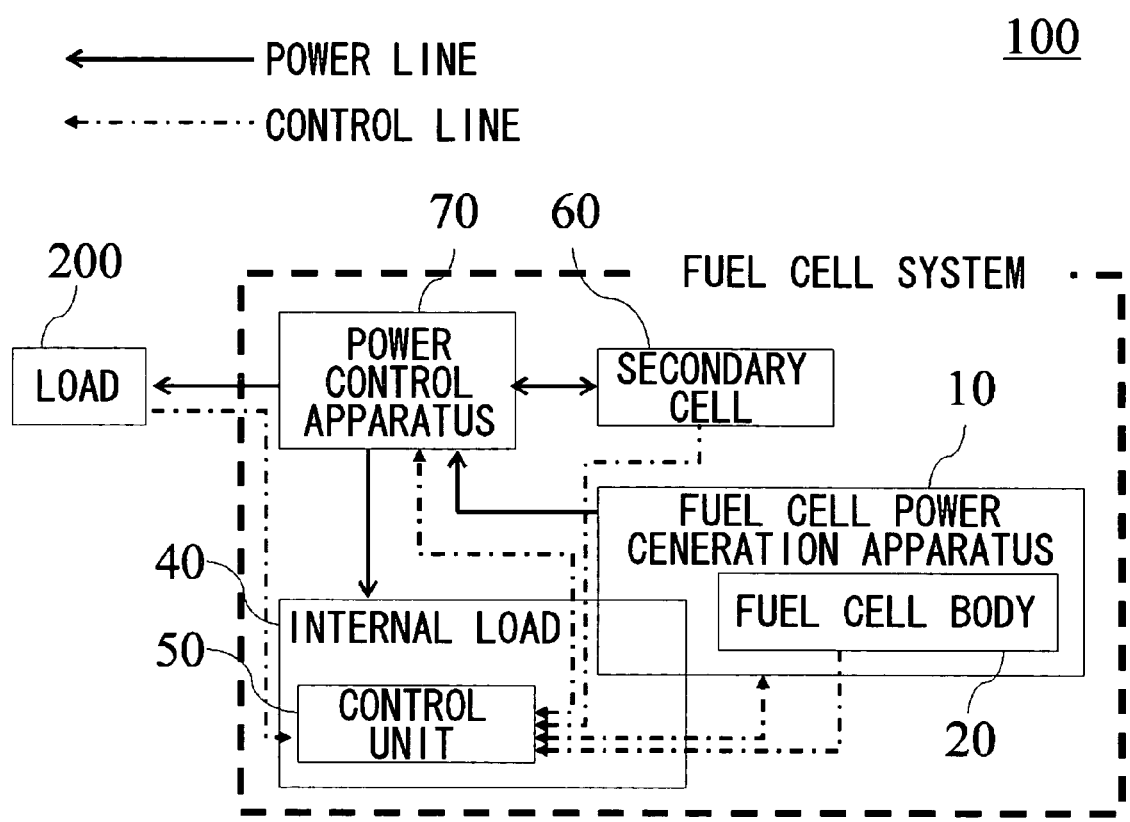
FIG. 1 schematically illustrates a structure of a fuel cell system according to an embodiment of the present invention.

FIG. 1 is a schematic diagram showing a structure of a fuel cell system 100. The fuel cell system 100 includes a fuel cell power generation apparatus 10 which is a first power supply, a secondary battery 60 which, as a second power supply, supplies power to internal load 40, such as auxiliary machinery and the like of the fuel cell power generation apparatus 10, at the starting of the fuel cell system 100 and also supplies power to load 200 when the power demanded by the load 200 is high, and a power control apparatus 70 which controls the balance of power supply between the fuel cell power generation apparatus 10 and the secondary battery 60. Also provided inside the fuel cell system 100 is a control unit 50, connected to the power control apparatus 70, which performs not only the transmission and reception of information, such as the electric energy required by the load 200, the electric energy suppliable from the fuel cell power generation apparatus 10 and the state of operation of the fuel cell power generation apparatus 10, but also various controls of the fuel cell power generation apparatus 10.

Figure 2:
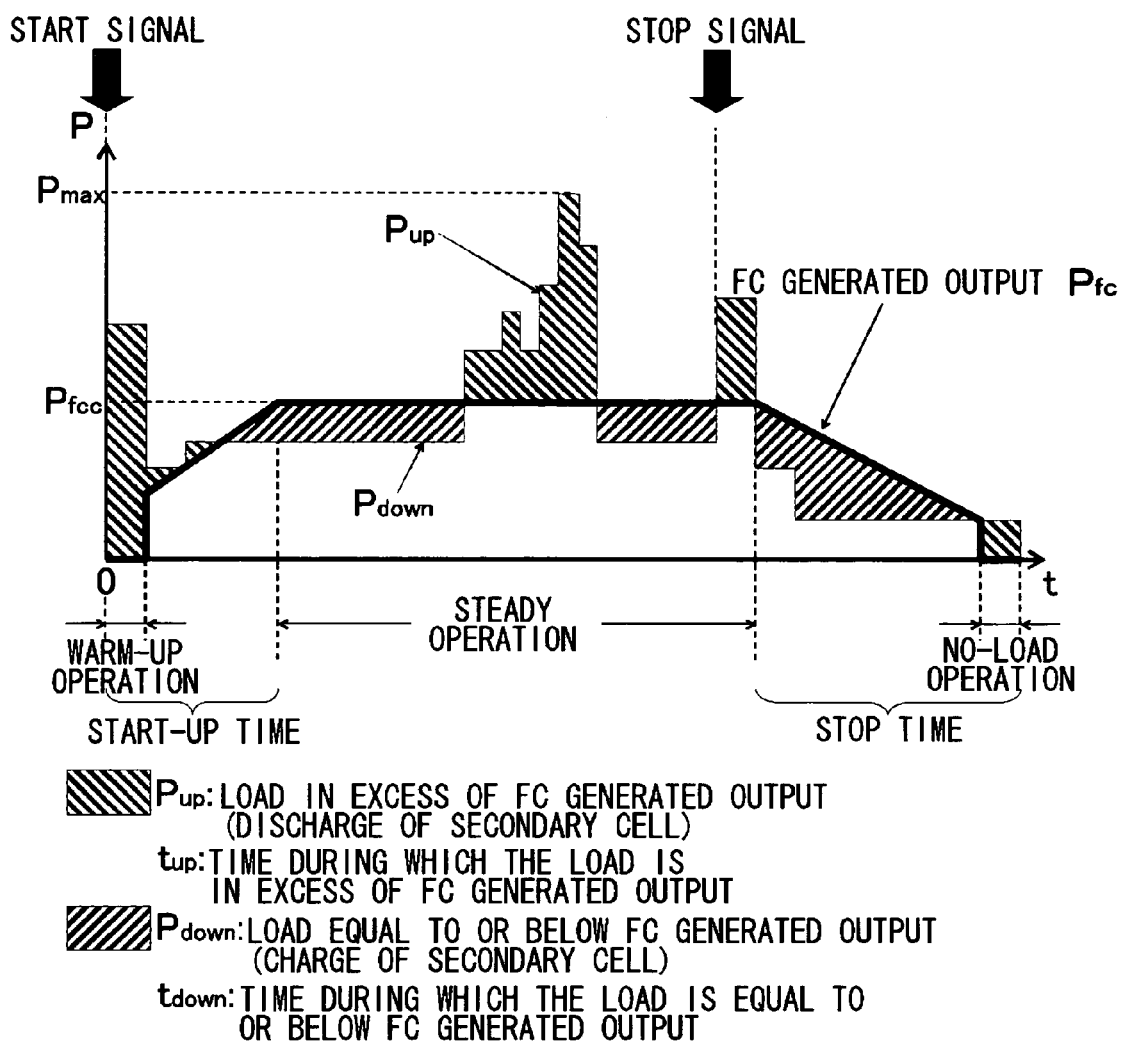
FIG. 2 is a graph showing schematically a relationship between an amount of electric power transmission to a load of a first power supply and that of a second power supply in a fuel cell system according to an embodiment of the present invention.

As is apparent from FIG. 2, it is preferable that the fuel cell power generation apparatus 10 be operated in such a manner as to output as constant a power $P_{fcc}$ as possible during steady operation excluding the starting and stopping of the fuel cell system. When a control unit 50 has received a signal requesting power from load 200 (a signal started by the load 200) at the starting of the fuel cell system 100, the control unit 50 starts the fuel cell power generation apparatus 10, but no power is outputted from the fuel cell power generation apparatus 10 for a predetermined period of time from the reception of the command (30 seconds with this fuel cell system 100) during which warming up thereof is performed. During this time, power is supplied to the load 200 and the internal load 40 from the secondary battery 60, and after the passage of the predetermined period of time, the output from the fuel cell power generation apparatus 10 is increased gradually. At the stopping of the fuel cell system 100, on the other hand, when the control unit 50 receives a signal for stopping the requested power from load 200 (a signal for shutdown if the load 200 is a personal computer or the like), the control unit 50 stops the fuel cell power generation apparatus 10, but there will be a predetermined period of time from the reception of the signal to the zeroing of the output from the fuel cell power generation apparatus 10 (15 minutes with this fuel cell system 100), which will be described in detail later. During this time, the surplus power from the fuel cell power generation apparatus 10 is supplied to the secondary battery 60 and used to recharge the secondary battery 60.

During steady operation, as mentioned above, an operation where the power outputted from the fuel cell power generation apparatus 10 is nearly constant is desired from the viewpoint of not only power generation efficiency but also durability. Hence, the power control apparatus 70 performs a control such that the power from the fuel cell power generation apparatus 10 stays within a predefined plus and minus range around $P_{fcc}$. However, the power demanded by the load 200 may vary with time. Accordingly, when the power in excess of the power $P_{fc}$ outputted from the fuel cell power generation apparatus 10 is demanded, the excess portion is supplied from the secondary battery 60, and when it is below the power $P_{fc}$, the surplus portion is supplied to the secondary battery 60 to recharge it.

The amount of power supplied from the secondary battery 60 to the load 200 (the amount of discharge of the secondary battery 60) and the amount of power supplied from the fuel cell power generation apparatus 10 to the secondary battery 60 (the amount of charge of the secondary battery 60) are desired to be such that the amount of charge is more than the amount of discharge (or at least equal to it) as expressed in Equation (1). Therefore, $P_{fc}$ is set from the maximum power $P_{max}$ required by the load 200, the drive time (10±3 h) thereof, etc., in such a manner as to satisfy Equation (1).

$$\int_0^{t_{up}}(P_{up}-P_{fc})\cdot dt \leq \int_0^{t_{down}}(P_{fc}-P_{down})\cdot dt \qquad (1)$$

where $t_{up}$ is the time when the power required by the load 200 is in excess of $P_{fc}$; $P_{up}$ is the required power value when the power required by the load 200 is in excess of $P_{fc}$; $t_{down}$ is the time when the power required by the load 200 is below $P_{fc}$; and $P_{down}$ is the required power value when the power required by the load 200 is below $P_{fc}$. The cell capacity C of the secondary battery 60 is desired to be large enough to absorb the above-mentioned variation of the load 200 and is thus set in a predetermined range in relation to the amount of power supplied from the secondary battery 60 to the load 200 (the amount of discharge of the secondary battery 60) as is shown by Equation (2).

$$k_{min} \cdot \int_0^{t_{up}} (P_{up} - P_{fc}) \cdot dt \leq C \leq k_{max} \cdot \int_0^{t_{down}} (P_{fc} - P_{down}) \cdot dt \qquad (2)$$

Here, it is preferable that $K_{min}$ be 1.0 to achieve the compact size and low cost of the fuel cell system 100, but it may best be set at 1.3 in consideration of the load variation. On the other hand, if the current value of the power generated by the fuel cell power generation apparatus 10 is so controlled as to maintain a predetermined amount of fuel (methanol solution) circulating therein, there will be a variation in $P_{fcc}$ as will be described later. Therefore, $k_{max}$, if set to 2.5, may allow the use of a secondary battery 60 which can well endure the load variation. However, it may best be set at 2.0 to achieve the compact size and low cost of the fuel cell system 100.

Figure 3:
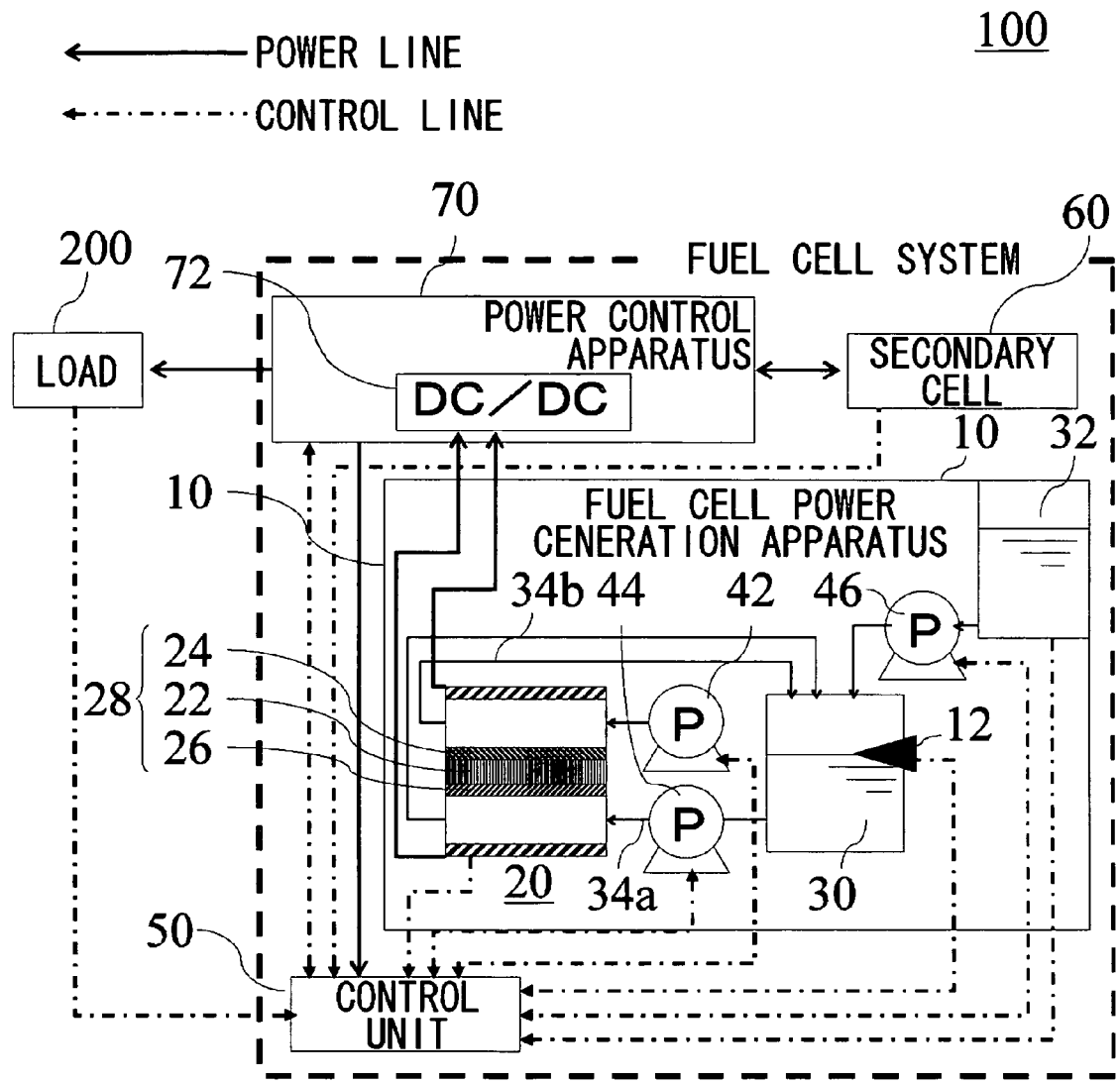
FIG. 3 illustrates a structure of a fuel cell system depicting in detail a structure of a fuel cell power generation apparatus shown in FIG. 1.

FIG. 3 illustrates a structure of a fuel cell system 100 according to the present embodiment depicting in detail a structure of a fuel cell power generation apparatus 10. The fuel cell power generation apparatus 10 is provided with a fuel cell body 20, which includes a solid electrolyte membrane 22 with a cathode 24 on one surface thereof and an anode 26 on the other, with air supplied to the cathode 24 as the oxidant and an aqueous methanol solution supplied to the anode 26 as the fuel. And the arrangement is such that the power generated by the fuel cell body 20 is boosted by a DC/DC converter 72 of a power control apparatus 70 and sent to the load 200. Provided as auxiliary machinery for this fuel cell power generation apparatus 10 are an air pump 42 that supplies air to the cathode 24 of the fuel cell body 20, a liquid pump (first liquid pump) 44 that supplies the aqueous methanol solution to the anode 26 thereof, and a fuel tank 30 that stores the aqueous methanol solution of a predetermined concentration (1.0±0.5 mol/L) to be supplied to the anode 26 thereof. And as the methanol in the fuel tank 30 is consumed with the progress of power generation by the fuel cell body 20, the methanol is supplied to the fuel tank 30 to refill it via a liquid pump (second liquid pump) 46 from a high-concentration fuel tank 32 which is detachably set on the fuel cell power generation apparatus 10 and is storing a high-concentration (15 mol/L or above) or 100% (25 mol/L) methanol.

The fuel tank 30 not only stores an aqueous methanol solution of a predetermined concentration, but also has a function of separating into the gas contents and liquid contents the substances (exhaust air with low-concentration oxygen, water generated by cathode reaction, aqueous methanol solution with low-concentration methanol, carbon dioxide produced by anode reaction) discharged from the cathode 24 side and the anode 26 side of the fuel cell body 20. The arrangement is such that the exhaust air and carbon dioxide in the discharged substances, which are cooled to temperatures near normal temperature by a not-shown radiator, are separated from the aqueous methanol solution in this fuel tank 30 and discharged outside the system. Together with the above-mentioned exhaust air and carbon dioxide, methanol and water (water vapor) contents of the aqueous methanol solution are released as gases, though in small quantities, into the outside of the system.

The amount of the evaporating methanol and water vapor discharged outside the system and the amount of the supplied or produced methanol and generated water may be balanced by properly designing the discharge path from the fuel tank 30 to the outside and the radiator and maintaining the compounding ratio of methanol and water (the concentration of the aqueous methanol solution) in the fuel tank 30 within a proper range. Nevertheless, since the evaporation amounts of methanol and water can vary with the environment (temperature and humidity) of the fuel cell system 100, it may sometimes be difficult to maintain a constant amount of the aqueous methanol solution flowing through the fuel cell power generation apparatus 10, that is, through the methanol solution circulation channel 34.

If a gas enters the outward path of the methanol solution circulation channel 34 with a reduction in the amount of aqueous methanol solution, an adequate amount of aqueous methanol solution will not be likely to be supplied to the anode 26 and as a result the carbon may decompose due to the fuel starvation especially when the anode 26 is situated on the bottom surface of the solid electrolyte membrane 22. If a necessary amount of aqueous methanol solution is supplied from the high-concentration fuel tank 32 to the fuel tank 30 in order to increase the amount of aqueous methanol solution, then a high-concentration aqueous methanol solution will circulate through the methanol solution circulation channel 34. That is, a high-concentration aqueous methanol solution will be supplied to the anode 26, which may give rise to such other problems as the crossover of methanol. On the other hand, if the amount of aqueous methanol solution increases and at the same time the concentration of the methanol solution is below a predetermined lower limit, the supply of methanol from the high-concentration fuel tank 32 to the fuel tank 30 may cause the overflowing of the fuel tank 30.

To solve this problem, a water level sensor 12 is provided in the fuel tank 36 and the amount of the aqueous methanol solution flowing through the methanol solution circulation channel 34 is monitored by the control unit 50. When operated at high current (arrow 1 in FIG. 4B), the fuel cell body 20 produces more water through an electrochemical reaction. Conversely, when operated at low current (arrow 2 in FIG. 4B), the fuel cell body 20 produces less water and more evaporation. FIG. 4A is a graph representing the amount of aqueous methanol solution in the fuel tank 30 when the atmospheric temperature is 20° C. and the humidity 50% (environment 1). In environment 1, if the fuel cell power generation apparatus 10 is so operated as to output $P_{fce}$ as shown in FIG. 4A, then there will be a balance between the generation of water from the fuel cell body 20 and the evaporation thereof, thus maintaining a nearly constant water level in the fuel tank 30.

Figures 5A, 5B:
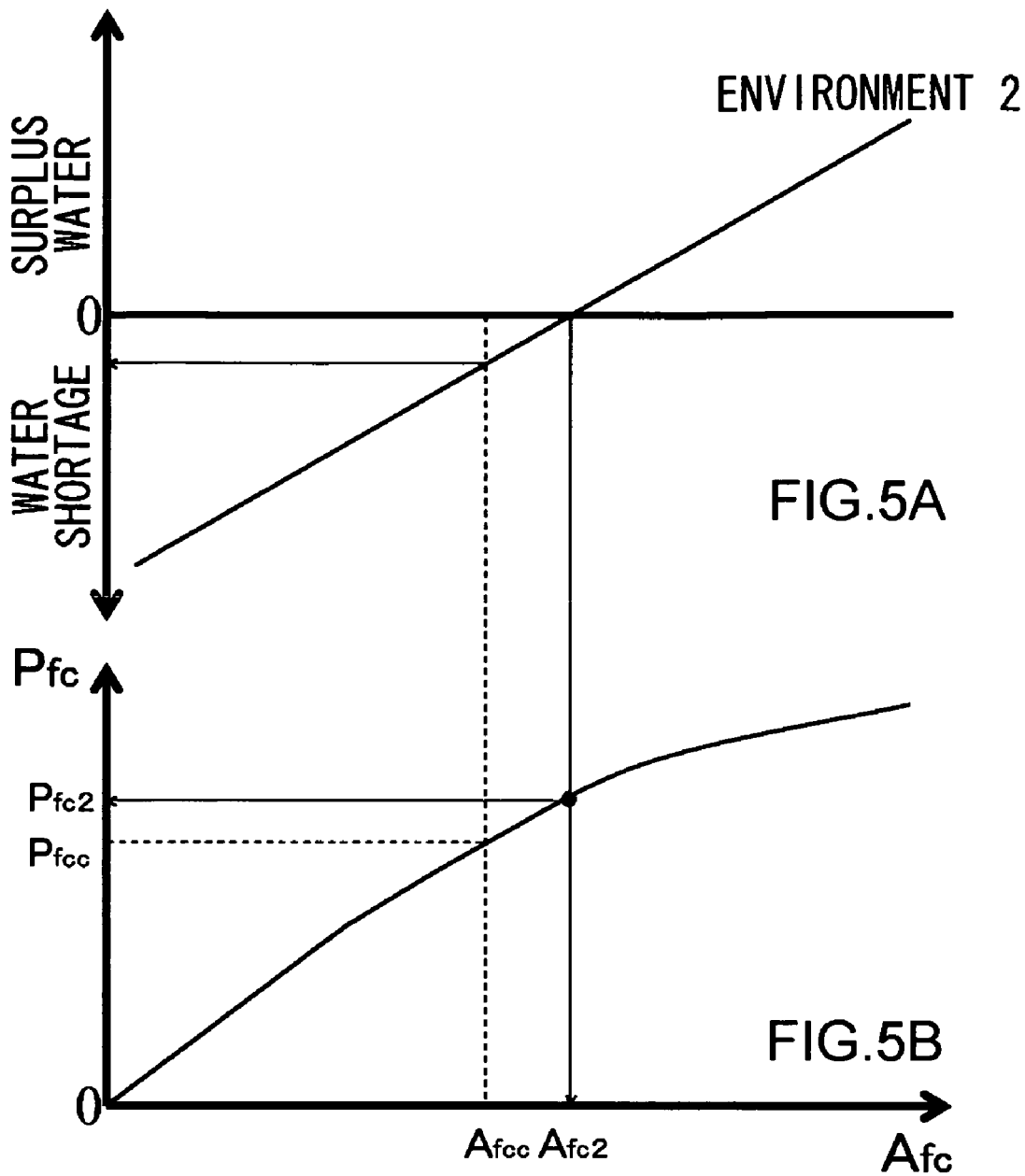
FIG. 5A is a graph representing the amount of aqueous methanol solution in a fuel tank under environment 2 in a fuel cell system according to an embodiment of the present invention.
FIG. 5B is a graph showing a relationship between currents and power generated by the fuel cell power generation apparatus.

FIG. 5A is a graph representing the amount of aqueous methanol solution in the fuel tank 30 when the atmospheric temperature is 30° C. and the humidity 70% (environment 2). In environment 2, if the fuel cell power generation apparatus 10 is so operated as to output $P_{fcc}$ as shown in FIG. 5A, then the evaporation of water will exceed the production of water from the fuel cell body 20 and there will be water shortage in the fuel tank 30. Thereupon, the control unit 50 performs a control for high-current operation from $A_{fcc}$ to $A_{fc2}$ to increase water produced by the fuel cell body 20 while monitoring the water level in the fuel tank 30. In other words, the control unit 50 changes $P_{fcc}$, which is the threshold value of output from the fuel cell power generation apparatus 10 set by the power control apparatus 70, to $P_{fc2}$, thereby realizing a high-current operation of the fuel cell power generation apparatus 10. And the surplus power that occurs with this high-current operation is used to recharge the secondary battery 60.

Figures 6A, 6B:
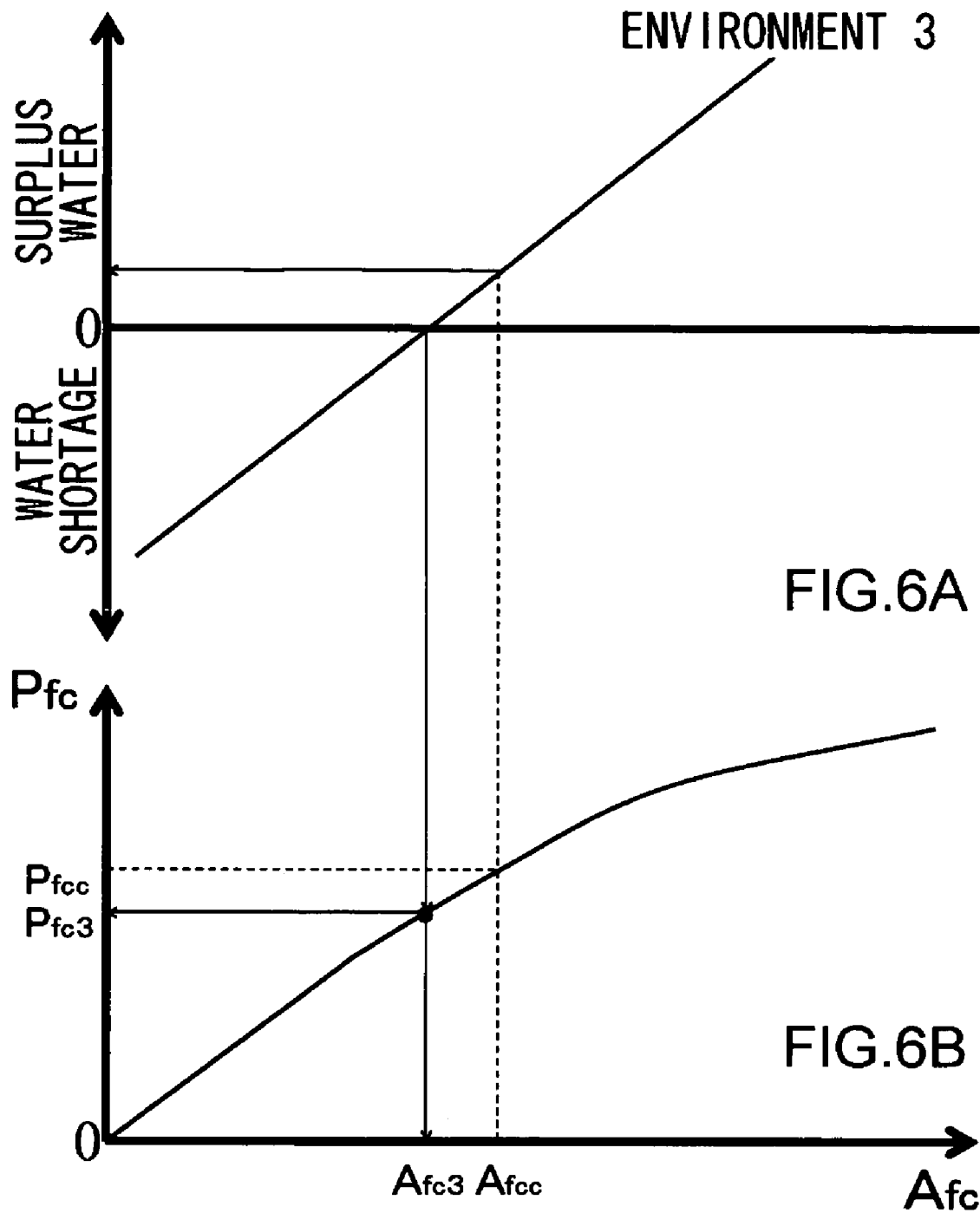
FIG. 6A is a graph representing an amount of aqueous methanol solution in a fuel tank under environment 3 in a fuel cell system according to an embodiment of the present invention.
FIG. 6B is a graph showing a relationship between currents and power generated by the fuel cell power generation apparatus.

FIG. 6A is a graph representing the amount of aqueous methanol solution in the fuel tank 30 when the atmospheric temperature is 10° C. and the humidity 30% (environment 3). In environment 3, if the fuel cell power generation apparatus 10 is so operated as to output $P_{fcc}$ as shown in FIG. 6A, then the production of water from the fuel cell body 20 will exceed the evaporation of water and there will be surplus water in the fuel tank 30. Thereupon, the control unit 50 performs a control for low-current operation from $A_{fcc}$ to $A_{fc3}$ to decrease water produced by the fuel cell body 20 while monitoring the water level in the fuel tank 30. In other words, the control unit 50 changes $P_{fcc}$, which is the threshold value of output from the fuel cell power generation apparatus 10 set by the power control apparatus 70, to $P_{fc3}$, thereby realizing a low-current operation of the fuel cell power generation apparatus 10. And the power deficiency that occurs with this low-current operation is made up by the secondary battery 60.

As already mentioned, when a signal for stopping a power request is given from the load 200 at the time of stopping, the control unit 50 stops the power generation by the fuel cell power generation apparatus 10. At this time, the control unit 50 performs both a charge processing, in which the residual power in the secondary battery 60 is checked and the secondary battery 60 is charged with a necessary amount of power for the subsequent start, and a maintenance processing, in which the fuel cell power generation apparatus 10 is maintained in an optimal condition. It is desirable that the inside of the fuel cell body 20 be maintained with a wetted solid electrolyte membrane 22 until the subsequent starting (during the stoppage of the fuel cell system 100). In order to prevent the CO exposure of the cathode 24 resulting from a combustion reaction (at the cathode 24) of the methanol having crossed over from the anode 26 to the cathode 24, it is desirable that the cathode 24 side of the interior of the fuel cell body 20 be filled with air of a low oxygen content (5% or less). Also, in order to prevent the freezing of the fuel cell body 20 during the stoppage of the fuel cell system 100, it is desirable that the anode 26 side of the interior of the fuel cell body 20 be filled with an aqueous methanol solution of a concentration (5±3 mol/L) which is higher than a predetermined concentration but still does not cause the deterioration of the solid electrolyte membrane 22.

A maintenance processing is done to maintain the fuel cell power generation apparatus 10 in an optimal condition as described above. Firstly, the control unit 50 operates the bare minimum of auxiliary machinery until the temperature of the fuel cell body 20 drops to or below a first predetermined temperature (45° C. according to the present embodiment) and then causes a power generation while cooling the fuel cell body 20 (However, the steady operation is continued for a necessary period of time if it is judged that the residual power in the secondary battery 60 is small and thus a power generation while cooling cannot supply the necessary power for the subsequent starting). During this time, the power necessary for the operation of the internal load 40 (auxiliary machinery) is supplied from the fuel cell power generation apparatus 10, and the surplus power after the supply to the internal load 40 is supplied to the secondary battery 60 (charge processing).

When the temperature of the fuel cell body 20 has dropped to the first predetermined temperature, the internal load 40 is separated from the fuel cell power generation apparatus 10, and then a no load operation is carried out until the temperature of the fuel cell body 20 drops to or below a second predetermined temperature (40° C. according to the present embodiment). That is, the power necessary for the operation of the internal load 40 (auxiliary machinery) is supplied from the secondary battery 60. When the temperature of the fuel cell body 20 has dropped to the second predetermined temperature, the supply of oxygen to the cathode 24 is shut off by stopping the air pump 42. The oxygen remaining inside the fuel cell body 20 is consumed gradually through reaction, and the voltage of the fuel cell body 20 also drops along with it. When the voltage of the fuel cell body 20 has dropped to a predetermined voltage or below or when a predetermined period of time has passed after the stopping of the air pump 42, the second liquid pump 46 is operated so that the aqueous methanol solution in the fuel tank 30 and the methanol solution circulation channel 34 may have a concentration (5 mol/L) higher than the predetermined concentration (1.0 mol/L), and then the first liquid pump 44 is stopped.

Then, by shutting off the channels leading to the outside by a not shown shutoff means, such as a shutter, to prevent the aqueous methanol solution from evaporating into the outside of the system, the fuel cell body 20 will be filled with air with a low-concentration oxygen and an aqueous methanol solution of a concentration higher than a predetermined concentration. As a result, there will be a reduced likelihood of combustion reaction or freezing, and it is possible to maintain the solid electrolyte membrane 22 in a wetted state.

Although it has not been described in detail, the second liquid pump 46 according to the present embodiment may be so set as to operate, or operate intermittently at predetermined intervals, when a drop in the concentration of the aqueous methanol solution is detected by a sensor detecting the concentration of the aqueous methanol solution or through the monitoring thereof by the output of the fuel cell 20. Also, the fuel is not limited to methanol, and any liquid fuel may be used for the fuel cell. The present invention is not limited to the use of a DMFC.

INDUSTRIAL APPLICABILITY

Although a personal computer was cited as an example of the load in the foregoing description, the present invention may be applied to any fuel cell system using a liquid fuel that can be used in various equipment, especially mobile devices.

What is claimed is:
1. A fuel cell system, comprising:
a fuel cell which generates power with a supply of liquid fuel;
a fuel supply unit which supplies the liquid fuel to said fuel cell and recovers generated water from said fuel cell;
a fuel state detector, provided in said fuel supply unit, which detects a water level of the liquid fuel including the generated water; and
a controller which changes an electric power value outputted from said fuel cell, based on the water level detected by said fuel state detector, wherein
in accordance with the detected water level, the controller controls the fuel cell so that (1) output current of the fuel cell becomes greater than output current obtained when an amount of evaporation of the generated water in the fuel supply unit is equal to an amount of water generated in the fuel cell to increase water to be generated in the fuel cell or (2) the output current of the fuel cell becomes less than the output current obtained when the amount of evaporation of the generated water in the fuel supply unit is equal to the amount of water generated in the fuel cell to decrease the water to be generated in the fuel cell.
2. A fuel cell system according to claim 1, further comprising a power supply unit which charges and supplies power to an external.

3. A fuel cell system according to claim 2, wherein when said fuel cell power generation apparatus is started, the electric power charged in said power supply unit is used.

4. A fuel cell system according to claim 2, wherein when a power demand is higher than the preset electric power value, the electric power charged in said power supply unit is used.

5. A fuel cell system according to claim 2, wherein when a power demand is lower than the preset electric power value, an electric power from said fuel cell power generation apparatus is used for charging the power supply unit.

6. A fuel cell system according to claim 2, wherein when said fuel cell power generation apparatus is stopped, an electric power from said fuel cell power generation apparatus is used for charging the power supply unit.

7. A fuel cell system according to claim 2, wherein the preset electric power value is set in a manner that, during a period from when said fuel cell system is started and until it is stopped, an amount of charge for which an electric power is supplied to the power supply unit is greater than an amount of discharge for which the power supply unit supplies an electric power to the external.

8. A fuel cell system according to claim 2, wherein, during a period from when said fuel cell system is started and until it is stopped, a capacity of the power supply is one to 2.5 times an amount of discharge for which the power supply unit supplies an electric power to the external.

9. A fuel cell system according to claim 8, wherein, during a period from when said fuel cell system is started and until it is stopped, the capacity of the power supply is 1.3 to 2 times the amount of discharge for which the power supply unit supplies the electric power to the external.

* * * * *